Feb. 16, 1943. G. L. DIMMICK 2,311,159
PRODUCTION OF SOUND RECORDS
Original Filed Oct. 9, 1937 4 Sheets-Sheet 1
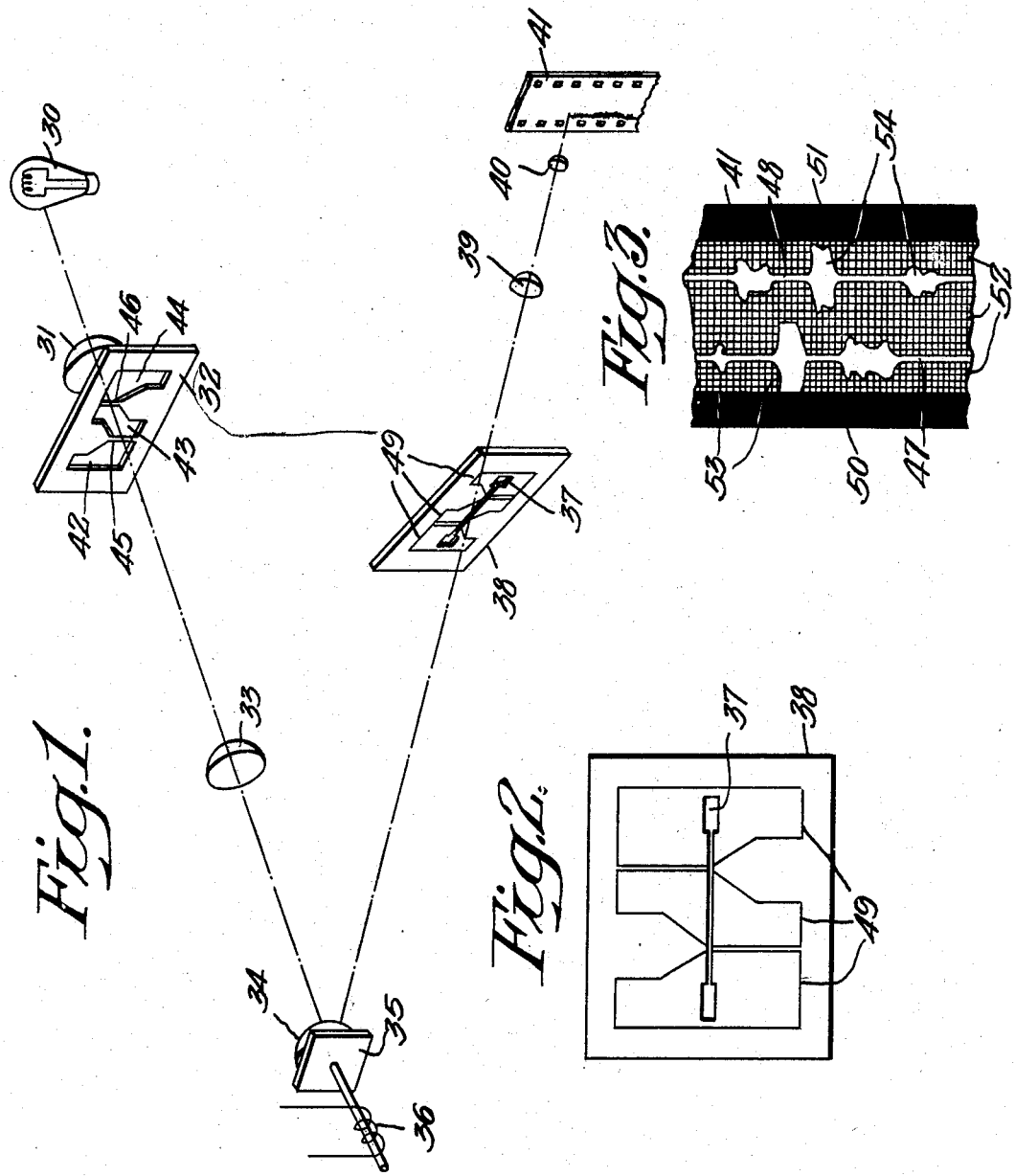
Inventor
Glenn L. Dimmick
By
Attorney

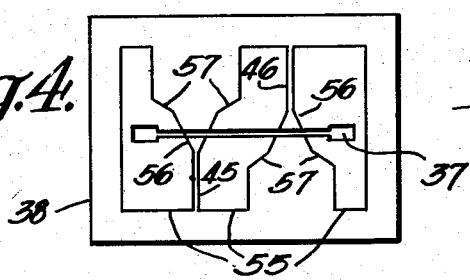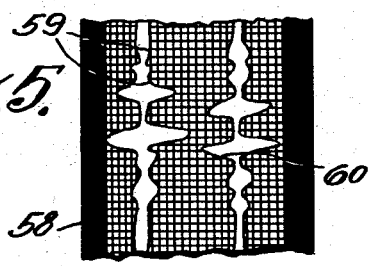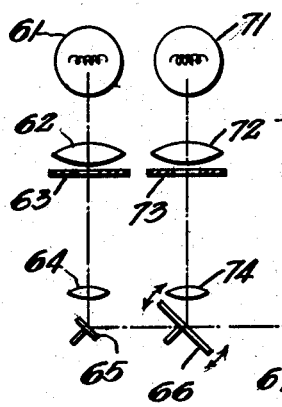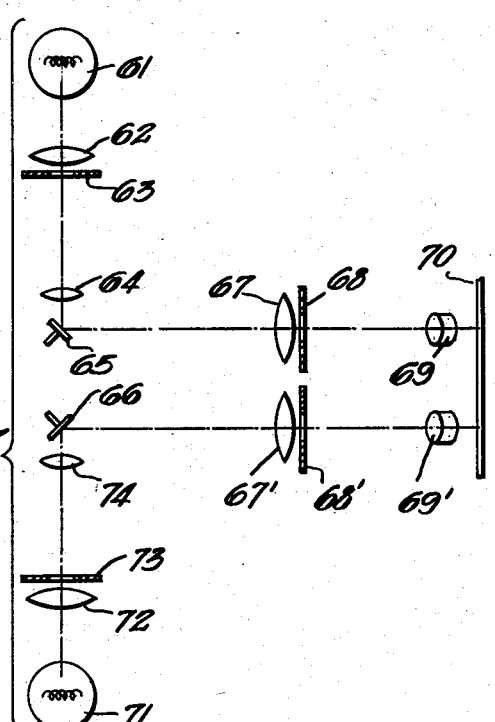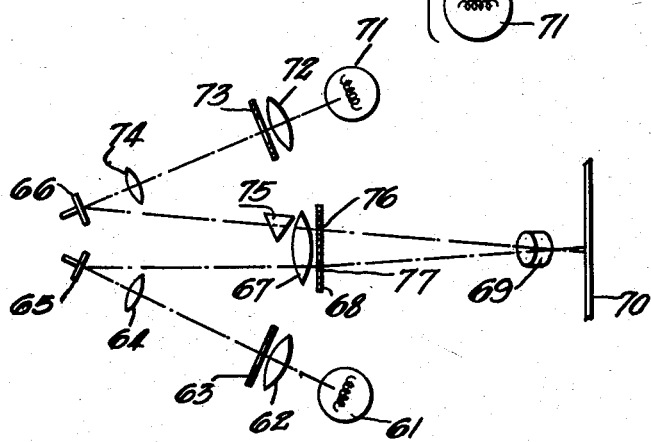

Feb. 16, 1943.   G. L. DIMMICK   2,311,159
PRODUCTION OF SOUND RECORDS
Original Filed Oct. 9, 1937    4 Sheets-Sheet 3
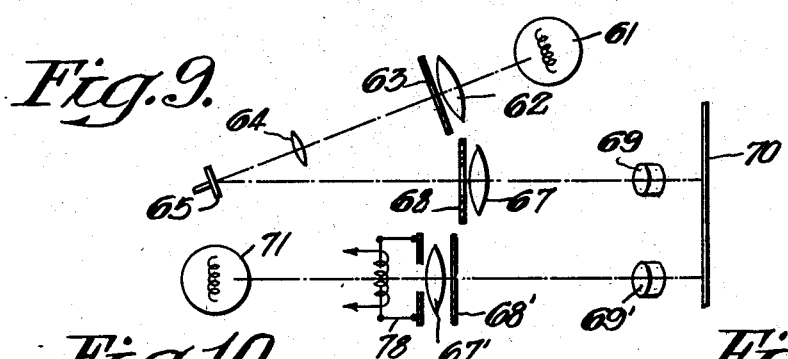
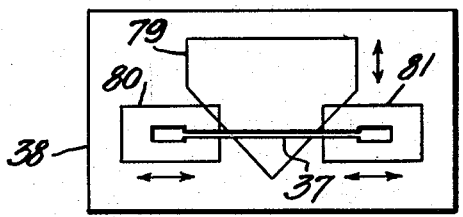
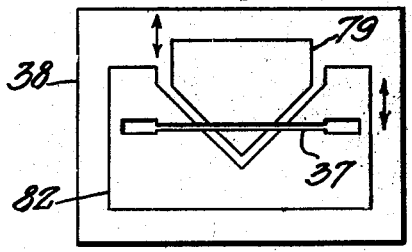
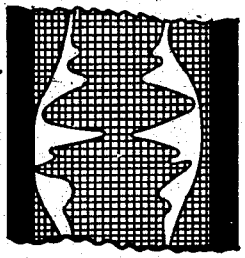
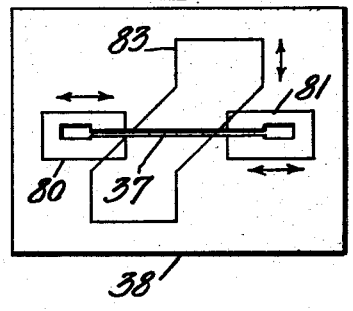
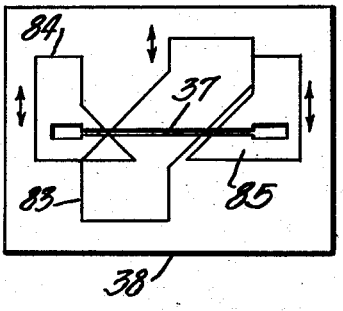
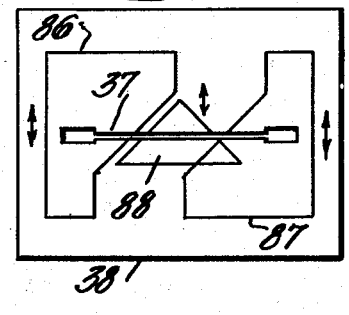
Inventor
Glenn L. Dimmick
By
[signature]
Attorney Feb. 16, 1943.　　G. L. DIMMICK　　2,311,159
PRODUCTION OF SOUND RECORDS
Original Filed Oct. 9, 1937　　4 Sheets-Sheet 4
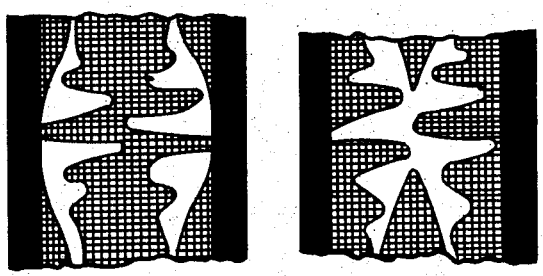
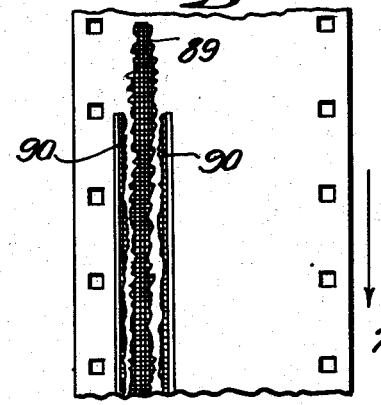
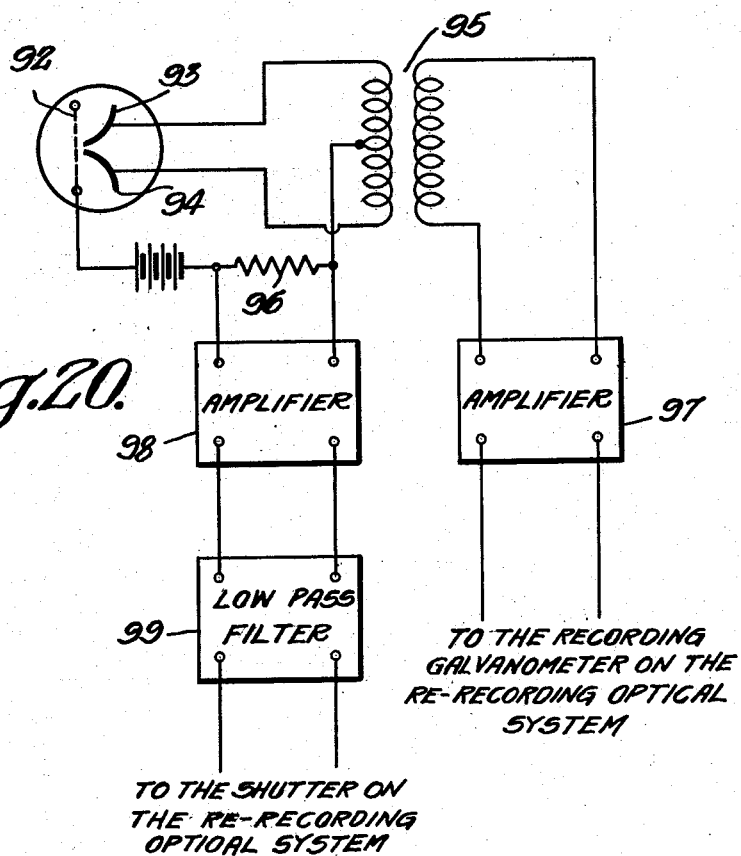
Inventor
Glenn L. Dimmick
By
Attorney Patented Feb. 16, 1943

2,311,159

UNITED STATES PATENT OFFICE 2,311,159

PRODUCTION OF SOUND RECORDS

Glenn L. Dimmick, Haddonfield, N. J., assignor to Radio Corporation of America, a corporation of Delaware Continuation of application Serial No. 168,173, October 9, 1937. This application June 1, 1940, Serial No. 338,424

12 Claims. (Cl. 179—100.3)

This invention relates to the production of sound records such as are utilized in connection with motion pictures, and has for its principal object the provision of an improved apparatus and method of operation whereby distortion of the sound reproduced from such records is minimized to an extent not heretofore realized. This application is a continuation of my application Serial No. 168,173, filed October 9, 1937.

In the production of photographic sound records of the variable area type, it is desirable that the original negative be capable of reproducing the original sound without distortion. Such a negative would have the advantage of affording a high quality medium for re-recording of the record.

In photography the original photographic record which is made is customarily referred to as a negative due to the fact that the light portions of the subject photographed appear dark and the dark portions appear light on this original photographic record. From this negative there is usually produced by a similar process a positive print in which the light and dark portions correspond with those of the original subject.

In the photographic recording of sound the photographic terms have, by common usage, become slightly changed in meaning, i. e., the positive is the photographic record adapted for reproduction in a photoelectric sound reproducer, while the negative is the corresponding record from which such a positive may be photographically produced, whether this negative be an original recording or not.

In the early days of variable area sound recording when no ground noise reduction was used and both records averaged 50 percent transparent and 50 percent opaque there was no noticeable difference between the positive and negative as either could be reproduced. The introduction of ground noise reduction, however, changed the situation in that the "positive" or film intended for reproduction had considerably more than half its area darkened at portions of low sound intensity thereby reducing the ground noise at such portions. Conversely, the negative had only a narrow darkened portion at places of low sound intensity and had a large transparent area. If such a negative were reproduced photoelectrically the sounds would be recognizable as in the earlier records but the ground noise would be greatly increased due to the greater light transmitted area.

In the following specification the terminology followed in the sound recording art will be adhered to and the film adapted for direct reproduction in the soundhead is termed a "positive" irrespective of whether it was produced as an original recording or by printing while a photographic record adapted to produce such a properly reproducable record by printing is termed a "negative" whether produced by printing or by original recording or re-recording. Where such a positive is produced directly in the recording apparatus by optical recording and conventional development and fixing it is referred to as a direct positive as distinguished from either a direct or original negative or a positive produced by photographically recording a negative and then photographically reversing the negative to form a positive.

In the past, the use of the original sound negative in this manner has not been possible for the reason that there has not been available a practical system for producing a direct positive and for the further reason that the photographic film heretofore available is incapable of producing such a negative due to its insufficient resolving power. Among the deleterious effects of this insufficient resolving power are spreading of the photographic image and the resulting extraneous sound resulting from rectification of the high frequencies. Spreading of the image has the disadvantage that closely adjacent boundary lines such as the valleys of the high frequency impulse records are obscured or filled in thus resulting in distortion of the reproduced sound. Relatively transparent spots in the otherwise opaque part of the sound record has the disadvantage that background noise is increased and the fidelity of the reproduced sound is correspondingly decreased.

There has recently become available a photographic film which possesses high resolving power and is relatively free of transparent spots in its otherwise opaque areas. An important object of the present invention is the provision of an improved apparatus and method of operation whereby this recently available film may be utilized to produce a high quality direct positive which is immediately available for reproduction to detect the characteristics of the original sound. As will hereinafter appear, this improved apparatus and method of operation is applicable to the production of variable area sound records of different types such as the double hump, class A push-pull, class B push-pull, class A—B push-pull, etc.

The use of this direct original positive fits readily into the present motion picture production routine for the reason that it is now customary to re-record most or all of the sound utilized in connection with motion pictures. It has the important advantage that the original recording may be reproduced with a tremendous volume range and with the highest fidelity realizable at the present time.

The invention also has important advantages in connection with the suppression of background noise in the recording and re-recording of sound. The various known methods of noiseless recording are not always satisfactory in operation for the reason that abrupt changes in volume level are likely to result in clipping of the peaks of the recorded sound waves. This difficulty is due largely to the fact that there is utilized for shading the otherwise clear part of the record a shutter or equivalent element which operates with more or less delay and therefore requires a predetermined time interval to respond to change in the volume of the recorded impulses. The present invention avoids this difficulty by the provision of an improved means for ensuring that the shading element is always actuated sufficiently in advance of changes in volume to prevent clipping of the recorded impulse peaks. As will hereinafter appear this advantage is applicable both to the original recording operation and to the subsequent re-recording operation. The re-recording operation, of course, results in a direct negative suitable for printing of the release prints distributed to motion picture theaters.

It is desirable to additionally expose the longitudinal edges of the sound record in order to ensure that the sound reproducer light beam does not extend into the clear part of the record and to produce along these edges opaque stripes of sufficient density to preclude the possibility of relatively transparent spots. A further object of the present invention is to provide an improved form of recording light slit for producing such stripes.

The invention will be better understood from the following description when considered in connection with the accompanying drawings and its scope is pointed out in the appended claims.

Referring to the drawings

Figure 1 is a diagrammatic showing of a recording system adapted to produce an original direct positive sound record, Figure 2 illustrates an aperture arrangement which is adapted to produce the N-shaped light beam utilized in the recording system of Fig. 1, Figure 3 illustrates the reversed class B type of record produced by the system of Fig. 1, Figure 4 illustrates an aperture arrangement adapted to be substituted in the system of Fig. 1 for producing a class A—B type of sound record, Figure 5 illustrates the class A—B type of record resulting from the use of the aperture arrangement of Fig. 4, Figures 6 to 9 illustrate different types of optical system for effecting a desired longitudinal displacement between corresponding parts of the sound track per se and the volume or envelope current record by which the otherwise transparent part of the record is shaded, Figures 10 and 11 illustrate different types of aperture arrangement for producing a direct positive record of the double hump type, Figures 12 and 13 illustrate the records produced respectively by the aperture arrangements of Fig. 10 and Fig. 11, Figures 14 to 16 illustrate different aperture arrangements for producing direct positive class A types of push-pull sound records, Figures 17 and 18 illustrate types of record produced by the aperture arrangements of Figs. 14 to 16, Figure 19 illustrates a sound record in which the sound track per se is displaced with respect to the sound volume responsive or shading record, and Figure 20 is a fragmentary diagram of a re-recording system involving certain features of the invention.

The sound recording system of Fig. 1 includes a light source 30 from which light is projected through a lens 31, a light stop or aperture plate 32 and lenses 33 and 34 to a galvanometer mirror 35 adapted to be vibrated in accordance with the sound impulses applied to its operating winding 36. From the mirror 35 light is reflected through the lens 34, the slit 37 of a light slit member 38 and objective lenses 39—40 to a photographic film 41 which is moved along its length dimension by any suitable means.

It will be noted that the aperture of the plate 32 has what may be designated as an N-shaped contour but comprises three separate openings 42, 43 and 44. In the construction of this aperture plate, the closely adjacent lower sections of the openings 41 and 42 are preferably separated by a wire 45 and the closely adjacent upper sections of the openings 43 and 44 are similarly separated by a wire 46. These wires serve to produce on the record (Fig. 3) at zero modulation the lines 47 and 48 which definitely define the record edges.

The image of the aperture 42—43—44 appears on the slit plate 38 at 49 and is vibrated transversely of the slit 37 by means of the mirror 35. In order to produce at the record edges the strongly exposed stripes 50—51 (Fig. 3) the slit 37 is enlarged at its ends as shown more clearly in Fig. 2. The record thus includes the additionally exposed areas 50—51, the normally exposed area 52, and the unexposed sound track areas 53 and 54, which are separate and spaced apart records, respectively, of the positive and negative half cycles of the recorded impulses. Otherwise stated, the sound record 41 is a direct positive of a class B push-pull sound record and may be utilized directly to reproduce the original sound with a very high degree of fidelity.

It is sometimes desirable to have available for direct reproduction a sound record of the class A—B type. Figs. 4 and 5 relate to a preferred method of producing such a record. In Fig. 4, the shape of the light beam is indicated at 55. It will be observed that this beam has in general an N-shaped contour but differs from the beam 49 of Figs. 1 and 2 in that the sloped portions are divided into sections of different slopes. Thus the slope of the edges 56 extending furthest into the beam is approximately one-half the slope of the edges 57 which are nearer the sides of the light beam. With this arrangement, the amplitude of the recorded modulation at low amplitudes in class A push-pull bears the same relation to the amplitude of the original sound as the higher amplitudes where the class B relation exists. The resulting record 58 is shown in Fig. 5, the two push-pull sound tracks being indicated, respectively, at 59 and 60.

With regard to noiseless recording or the elimination of background noise, the standard single edged and the class A push-pull recording systems are subject to the same limitations as the systems involving the use of a biased triangle or a biased shutter. This limitation is the result of simultaneously recording the corresponding audio impulse and audio impulse volume tracks at the same locations longitudinally of the record. Thus the first few waves of a rapidly increasing wave train are clipped off at the peaks because the noise reduction circuit cannot be made fast enough without producing an audible thump or gurgle in the reproduced sound. This extraneous noise would be avoided if the noise reduction system could anticipate the coming modulation signal.

In the present recording systems, however, where the noise reduction is effective only after the printing of the original negative to a positive, the noise reduction signal operates to decrease the length of the recording light beam and the modulation and noise reduction signals must be recorded at the same point longitudinally of the film.

When the original recording is made noiseless by the use of direct positive previously considered, the noise reduction signal takes the form of an added beam of light and may therefore be displaced with respect to the corresponding part of the modulation signal. Thus the noise reduction signal may, under these conditions, be recorded on the film at a position in advance of the modulation signal so as to anticipate changes in the level of the modulation signal and avoid the modulation signal wave peak clipping heretofore encountered. This procedure has the additional advantage that the noise reduction circuit may be made to act slower than at present and the narrow transparent line at zero modulation may be made much smaller.

Fig. 6 illustrates one type of optical system for producing this desired spacing between corresponding parts of the modulation and noise reduction records. This system includes a light source 61 from which light is projected through a lens 62, the aperture of a plate 63 and a lens 64 to a galvanometer mirror 65 which is vibrated in accordance with the modulation signal or the impulses to be recorded. Light is reflected from the mirror 65 through a partially silvered mirror 66, a lens 67, the light slit of a plate 68 and objective lenses 69 to a photographic film 70.

This system also includes a light source 71 from which light is projected through a lens 72, the aperture of a plate 73 and a lens 74 to the partially silvered mirror 66 which is vibrated in accordance with the noise reduction signal or modulation signal impulse envelope current. Light is reflected from the mirror 66 through the lens 67, the light slit of plate 68 and the lenses 69 to the film 70 which is considered as movable longitudinally in a direction perpendicular to the paper.

As will hereinafter appear in connection with Figs. 10 to 18, the apertures of the plates 63 and 73 may assume various forms and the movements of the mirrors 65 and 66 may assume various relations depending on the type of record to be produced. In any of these applications, the system of Fig. 8 has the advantage that both the signal modulated beam and signal envelope beam are applied to the film through a common path.

The optical system of Fig. 7 will be readily understood in view of the previous explanation. It differs from that of Fig. 6 in that the two light beams are applied to the film 70 through separate paths.

Fig. 8 illustrates an alternative form of optical system including a prism 75 and separate slits 76 and 77 for the two light beams. This system transmits light with somewhat greater efficiency than that of Fig. 6 as will be readily understood.

Fig. 9 illustrates an optical system which is similar to those previously considered in some respects but differs therefrom in that the noise reduction signal is utilized to operate a shutter mechanism 78 whereby the noise reduction or signal envelope current track is produced. As will appear, this shutter may be of the double vane type, the triangular type, the W-shaped type or of other suitable types depending on the kind of record to be produced.

In the following consideration of Figs. 10 to 18, it is assumed that both beams are transmitted through the same light slit 37. It should be understood, however, that the advantages of these various systems are not limited to the use of a single light slit but may be realized from the use of the various optical systems of Figs. 6 to 9. Thus the modulation and noise reduction beams may have the contours indicated by Figs. 10, 11, 14, 15 and 16, may pass through separate light slits and may be focused at different points longitudinally of the film or otherwise as desired.

Double hump direct positive records of the in-phase (standard) type may be produced by the light beam arrangement of Figs. 10 and 11.

In the arrangement of Fig. 10, the triangular light beam 79 is vibrated transversely of the light slit 37 in accordance with the modulation or audio frequency impulse component and the beams 80 and 81. Thus as the signal volume or level increases, the beams 80 and 81 are moved in opposite directions toward the ends of the slit and vice versa. The resulting record is shown in Fig. 13. If the beam 79 is moved in accordance with the noise reduction component and the beams 80 and 81 are moved in accordance with the modulation component, however, the reversed negative record of Fig. 12 is produced. As will be apparent, either of these records may be produced by a recorder wherein the beams 80 and 81 are defined by apertures in the shutter mechanism 78 of Fig. 9, this mechanism being disclosed in greater detail in a copending application of Baker et al., Serial No. 82,596, filed July 19, 1937, and assigned to the same assignee as the present application.

The original direct positive record of Fig. 13 may also be produced by the light beam arrangement of Fig. 11 which includes the beam 79 vibrated transversely of the light slit in accordance with the modulation component and a beam 82 similarly vibrated in accordance with the noise reduction component. It is obvious that these two beams may be produced and suitably controlled by the optical systems of Figs. 6 to 9 if apertures of the required contour are provided in the plates 63 and 73.

Direct positive records of the class A (180 degree-out-of-phase) type may be produced by the light beam arrangements of Figs. 14, 15 and 16. The record produced by the beam arrangements of Figs. 14 and 15 is shown by Fig. 17 and that produced by the beam arrangement of Fig. 16 is shown in Fig. 18.

In the arrangement of Fig. 14, a beam 83 is vibrated transversely of the slit 37 in accordance with the modulation component and the beams 80 and 81 are vibrated in accordance with the noise reduction component lengthwise of the slit as explained in connection with the somewhat similar arrangement of Fig. 10.

In the arrangement of Fig. 15, the beam 83 is vibrated transversely of the slit in accordance with the modulation component and the beams 84 and 85 are vibrated transversely of the slit in accordance with the noise reduction component. In the arrangement of Fig. 16 the beams 86 and 87 are vibrated transversely of the slit in accordance with the modulation component and the beam 88 is similarly vibrated in accordance with the noise reduction component. It will be apparent that the provision of suitable apertures in the plates 63 and 73 of Figs. 6 to 8 readily accommodates these various optical systems to the light beam arrangements of Figs. 15 and 16.

Fig. 10 illustrates somewhat more in detail the general type of record wherein the modulation record 89 and the noise reduction record 90 are displaced longitudinally of the film to prevent clipping of the modulation peaks. As a general rule, it is desirable that this displacement be of the order of one inch although this requirement is somewhat dependent on the character of the system utilized.

The various features heretofore considered are particularly advantageous in the production of an original direct positive sound record which may be reproduced with a high degree of fidelity and may be utilized for re-recording to a direct negative from which commercial prints are made. The re-recording optical system must, of course, make the conventional negative which is noiseless only after printing. The advantage of suitably spacing corresponding parts of the modulation and noise reduction records may be carried over into the re-recording operation provided the original direct positive is of the class A type push-pull type and the release print is either of the standard or class A push-pull type.

A re-recording system suitable for producing this result is illustrated by Fig. 20. This system includes a photoelectric device 91 provided with an anode 92 and with cathodes 93 and 94. The illumination of the device 91 is modulated in a well known manner by any of the class A records previously discussed. Current thus modulated is delivered to the primary winding of a transformer 95 through an impedance element such as a resistor 96. Modulation current is supplied from the secondary of the transformer 95 through an amplifier 97 to the modulation winding of the recorder galvanometer. Current for operating the noise reduction element of the re-recorder is supplied from the anode lead resistor 96 through an amplifier 98 and a low pass filter 99 to the re-recorder noise reduction shutter or equivalent element.

As will be readily understood, the original direct positive having the modulation and noise reduction records suitably displaced longitudinally of the film with respect to one another is reproduced in the usual manner. The anode current from such a balanced circuit is independent of the modulation and is only a function of the noise reduction or volume level current. Current thus derived from the anode lead is utilized to operate the re-recorder shutter, thus transferring to the re-recorded direct negative and to the final release print the same displaced or offset relation between the modulation and noise reduction recorder. As previously indicated, features of outstanding advantage are the availability of the original reverse negative for high quality reproduction and the absence of peak clipping due to displacement of the modulation and noise reduction records.

The production of a direct positive record of the singly modulated type is old, as shown, for example, in Robinson Patent 1,935,417, and although such records are useful they are not completely satisfactory in the performance of my improved process due to a form of distortion known as zero shift. In the production of variable area records, the effect known as zero shift is produced by the filling in of the bottoms of the wave images particularly at high frequencies during development. This produces spurious frequencies corresponding with the envelope of the high frequency sounds and interfering with the proper reproduction thereof. In the singly modulated type of record as ordinarily made the effect of this zero shift is eliminated in printing as described in the article entitled "Modulated high frequency recording as a means for determining conditions for optimal processing," by J. O. Baker and D. H. Robinson, Journal of the Society of Motion Picture Engineers, volume 30, No. 1, January, 1938. In recording a singly modulated track as described by Robinson, the zero shift can not be cancelled in this manner and the distortion due thereto accordingly persists in the reproduction. In a push pull record the zero shift is cancelled electrically in the reproduction of the record and therefore a direct positive push pull record may be satisfactorily used in the performance of my process.

I claim as my invention:

1. The variable area impulse record producing method which includes making a direct positive push-pull record of said impulses having anticipatory noise reduction, rerecording said direct positive record to a direct negative record having anticipatory noise reduction, and printing release prints from said direct negative record.

2. The impulse record producing method which includes simultaneously making a direct positive push-pull record of said impulses and of the volume of said impulses, the latter being disposed in advance of said push-pull record and rerecording said direct positive record to a direct negative record, said rerecorded negative having the volume record thereon disposed in advance of said push-pull record.

3. An impulse recording system including means for making a direct positive push-pull record of said impulses, and means for making a direct positive impulse volume record adjacent to and displaced longitudinally of said impulse record.

4. The variable area impulse record producing method which includes making a direct positive type B push-pull record of said impulses, rerecording said direct positive record to a direct negative record, and printing release prints from said direct negative record.

5. The impulse record producing method which includes simultaneously making a direct positive type B push-pull record of said impulses and of the volume of said impulses disposed in advance of said push-pull record, and rerecording said direct positive record to a direct negative record.

6. An impulse recording system including means for making a direct positive type B push-pull record of said impulses, and means for making a direct positive impulse volume record adjacent to and displaced longitudinally of said impulse record.

7. The impulse record producing method which includes simultaneously making a direct positive record of said impulses and of the volume of said impulses, additionally exposing the edges of said direct positive record, and rerecording said direct positive record to a direct negative record having a record of the volume of said impulses.

8. An impulse record producing system which includes means for simultaneously making a direct positive record of said impulses and of the volume of said impulses, means for causing said records to be located adjacent to and displaced longitudinally of one another, means for rerecording said direct positive records to a direct negative record in the same geometrical relation, and means for additionally exposing the edges of said direct positive record.

9. An impulse recording system including means for making a direct positive record of said impulses, means for making a direct positive impulse volume record adjacent to and displaced longitudinally of said impulse record, means for rerecording said direct positive records to a direct negative record in the same geometrical relation, and means for additionally exposing the edges of said direct positive.

10. An impulse recording system including means for making a direct positive impulse record whereon the positive and negative half cycles of said impulses are recorded on tracks separated from one another, and means for rerecording said record to a direct negative record.

11. An impulse recording system including means for making a direct positive impulse record whereon the positive and negative half cycles of said impulses are recorded on tracks separated from one another, means for recording said record to a direct negative record, and means for additionally exposing the edges of said direct positive record.

12. An impulse recording system including means for making a direct positive impulse record whereon the positive and negative half cycles of said impulses are recorded on tracks separated from one another, means for recording said record to a direct negative record, and means defining a light slit enlarged at its opposite ends for additionally exposing the edges of said direct positive record.

GLENN L. DIMMICK.